Sept. 6, 1966 R. J. MISTARZ 3,270,784
METHOD AND APPARATUS FOR DISPENSING FOAMABLE LIQUIDS
Filed Feb. 4, 1963 3 Sheets-Sheet 1

Inventor:
Robert J. Mistarz
By Hofgren, Wegner, Allen, Stellman & McCord
Attorneys.

Sept. 6, 1966  R. J. MISTARZ  3,270,784
METHOD AND APPARATUS FOR DISPENSING FOAMABLE LIQUIDS
Filed Feb. 4, 1963  3 Sheets-Sheet 2
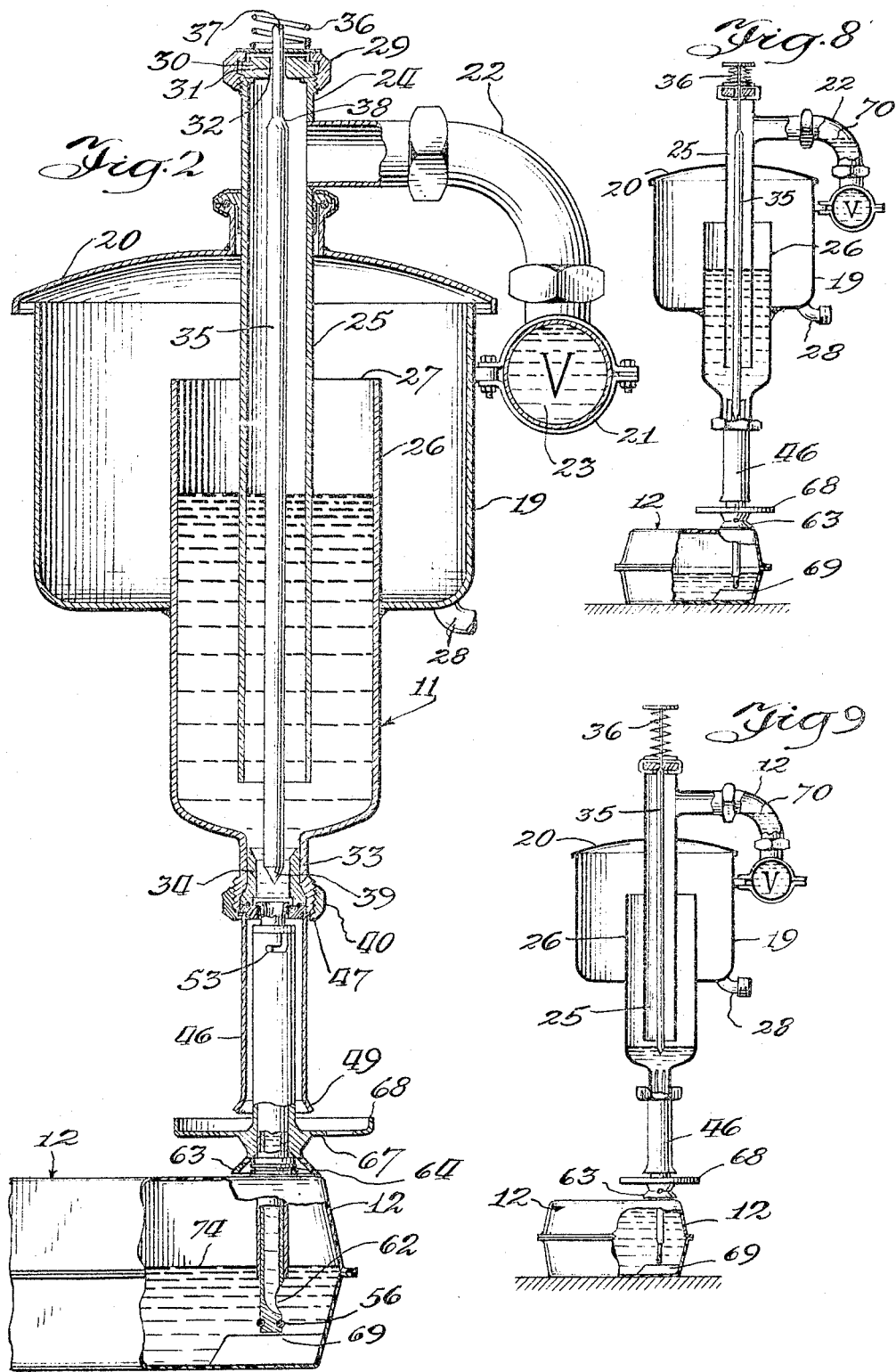

Sept. 6, 1966    R. J. MISTARZ    3,270,784
METHOD AND APPARATUS FOR DISPENSING FOAMABLE LIQUIDS
Filed Feb. 4, 1963    3 Sheets-Sheet 3
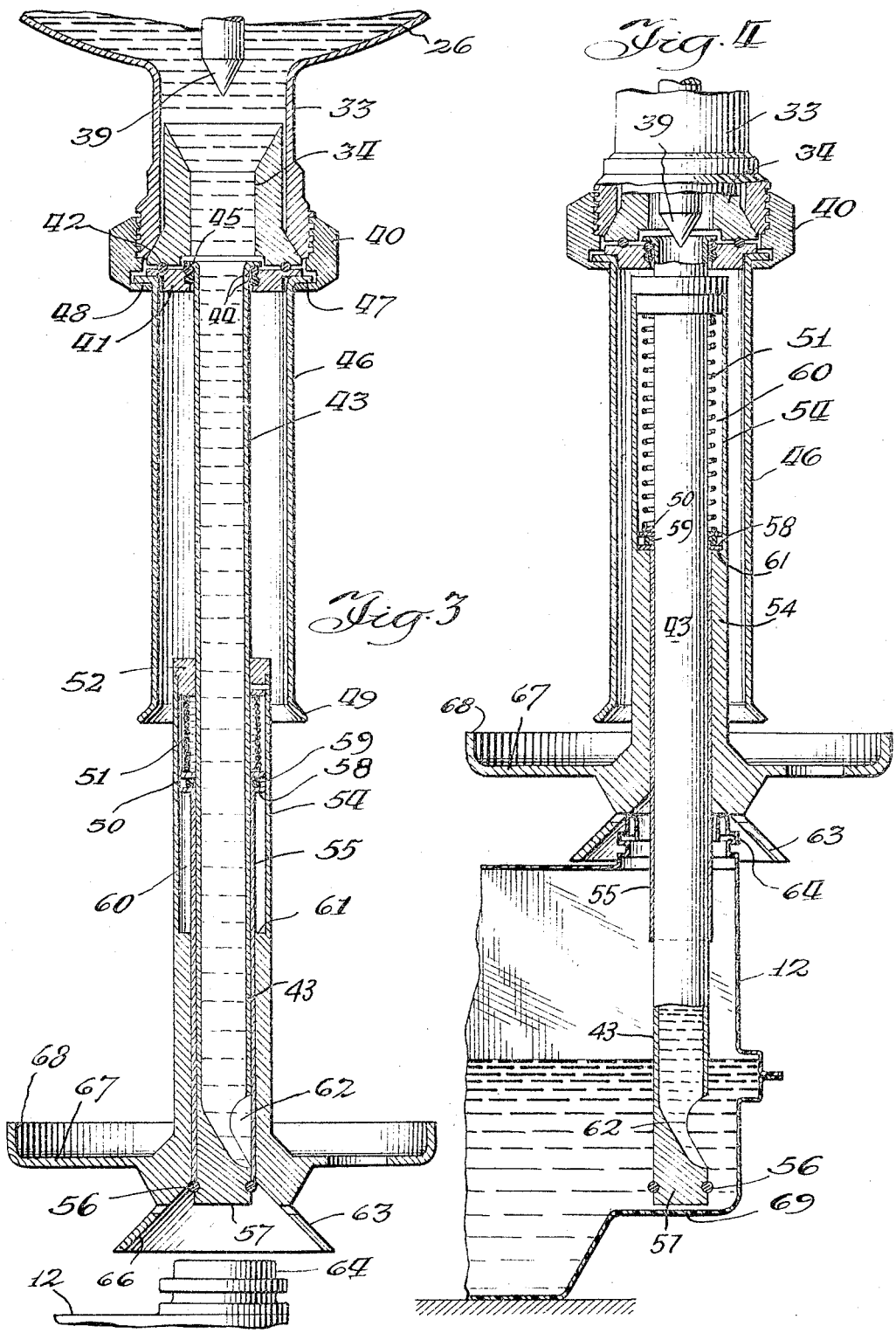

United States Patent Office 3,270,784
Patented Sept. 6, 1966

3,270,784
METHOD AND APPARATUS FOR DISPENSING FOAMABLE LIQUIDS
Robert J. Mistarz, Northbrook, Ill., assignor to Chicago Stainless Equipment Corporation, a corporation of Illinois
Filed Feb. 4, 1963, Ser. No. 258,372
9 Claims. (Cl. 141—2)

This invention relates to a liquid dispensing device for dispensing measured quantities of liquid into a container.

The dispensing device of this invention is particularly applicable for packaging measured quantities of a liquid and particularly a foamable liquid such as milk. The device results in very rapid dispensing under completely sanitary conditions and with the production of only a very minimum amount of foam when the liquid is a foamable liquid.

One of the features of this invention therefore is to provide an improved liquid dispensing device in which a measuring receptacle is used accurately controlling each measured portion of liquid together with means for precisely transferring liquid to the measuring receptacle and means for flowing liquid from the receptacle at a controlled rate of flow.

Another feature of the invention is to provide an improved dispensing device in which a measuring receptacle is employed to apportion precisely controlled portions of the liquid and an exit conduit is also provided which is maintained enclosed and thus in sanitary condition and is not exposed until it has been projected into the container to which the measured portion of liquid is transferred.

A further feature of the invention is to provide an improved liquid dispensing device including self-aligning means for automatically and accurately centering the device relative to the container.

Yet another feature of the invention is to provide an improved liquid dispensing device having any and all of the features set out above together with improved means for maintaining the sanitary conditions under which the device operates.

Another feature of the invention is to provide an improved method of discharging a foamable liquid into a container in which high speed of discharging is attained with minimum foaming.

Other features and advantages of the invention will be apparent from the following description of one embodiment thereof taken in conjunction with the accompanying drawings. Of the drawings:

FIGURE 2 is a longitudinal sectional view partially broken away for clarity of illustration of a portion of the apparatus illustrating one individual dispensing device for filling a series of individual containers.

FIGURE 3 is an enlarged sectional view showing a portion of the device of FIGURE 2.

FIGURE 4 is a view similar to FIGURE 3 but showing the parts at a subsequent stage of the dispensing.

Figures 5, 6, 7:
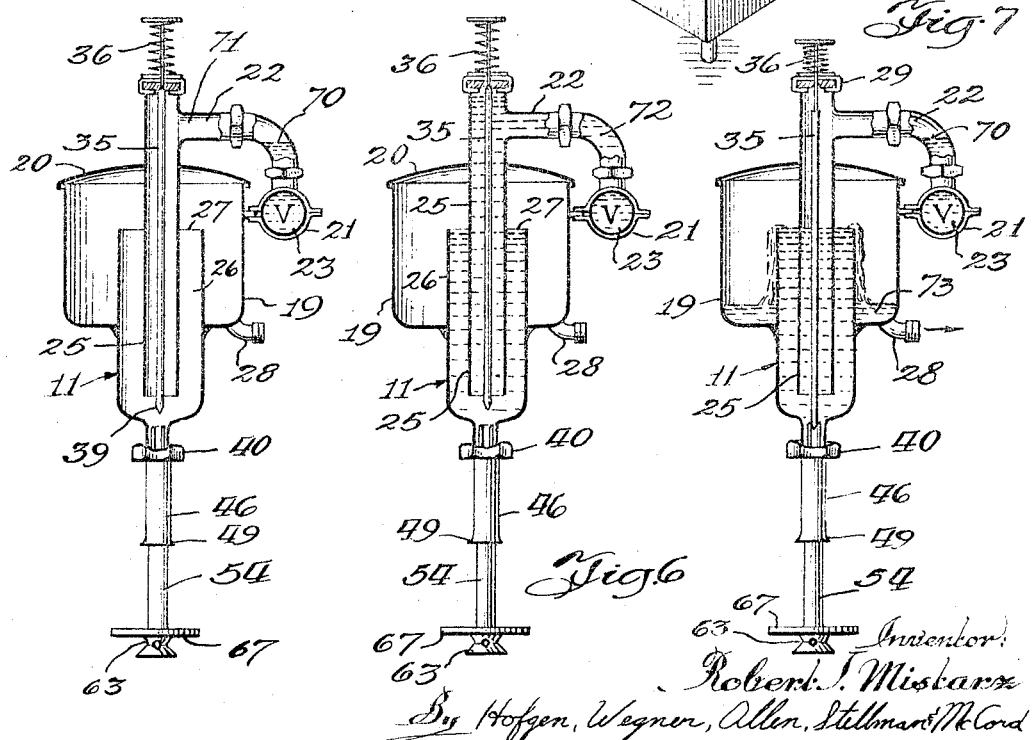

FIGURES 5–9 inclusive are successive views showing the parts of the dispensing device at successive stages of the dispensing commencing with the beginning of operation in FIGURE 5 with the empty container and terminating at FIGURE 9 with the filled container.

Figure 1:
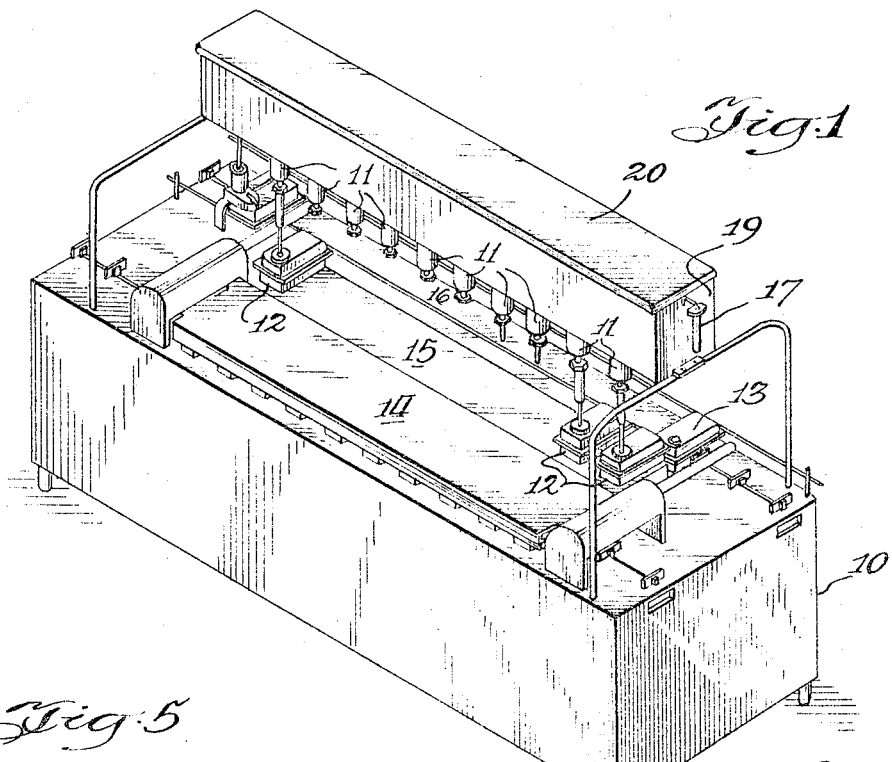
FIGURE 1 is a perspective view of a portion of an apparatus containing an assembly of dispensing devices embodying the invention.

In FIGURE 1 there is provided a cabinet 10 in which the operating mechanism is primarily housed. The portion of the apparatus which embodies the invention disclosed and claimed herein includes a series of ten dispensing devices 11 each adapted to dispense a measured quantity of liquid into a container 12. For simplicity of illustration, only three of these containers are shown in FIGURE 1 in the act of being filled and only one container identified at 13 is shown after it has been filled. In general, however, a series of ten linearly aligned containers 12 are arranged, by means not shown, on a platform 14 and they are then transferred laterally, by means not shown, to a vertically movable second platform 15 on which the three containers 12 of the series of ten are shown in FIGURE 1 with the others being omitted in order to avoid confusion. Then, after the containers have been filled in one joint operation of the ten dispensing devices 11, the filled containers 13 are transferred, by means not shown, to a conveyor 16 which removes the filled containers from the apparatus. The dispensing devices are operated in unison in a manner hereinafter described in connection with one dispensing device by means including a vertically reciprocable device 17.

FIGURES 2, 3 and 4 illustrate a single dispensing device 11 and a single container 12. However, all dispensing devices 11 are connected by a common liquid trough 19 provided with a removable cover 20 which is shown in simplified form in FIGURE 1. In addition, all dispensing devices are filled by means of a common manifold pipe 21 provided with a series of supply conduits 22 with each dispensing device 11 having its own conduit 22. Flow of liquid from the pipe 21 through all conduits 22 is controlled by a single valve that is indicated diagrammatically at 23.

Each conduit 22 has an elevated portion 24 which in the illustrated embodiment is at the top of a vertical pipe 25 so as to form a part of the supply conduit 22.

Extending through the bottom of the common trough 19 is a generally cylindrical measuring receptacle 26 that has an open top with the edge 27 operating as an overflow portion. Excess liquid in the receptacle 26 flows over this edge 27 into the trough 19 and out a fitting 28 at the bottom of the trough which leads back to the source of the liquid.

In the elevated portion 24 there is provided a removable collar 29 which removably retains a vacuum breaker valve means 30 that includes an opening 31 therethrough and a valve seat 32.

The bottom of each receptacle 26 is provided with an exit conduit 33 leading therefrom in which is positioned a flow orifice 34.

Vertically movable within the vertical pipe 25 is a movable member 35, here shown as a rod, which forms a part of the movable means for causing a further liquid portion to flow from the conduit 22 into the receptacle 26 and also simultaneously for restricting the exit conduit 33 and particularly the orifice 34 thereof for retarding flow of liquid through the exit conduit. In order to function in this manner the rod 35 is vertically movable by means that includes the device 17 of FIGURE 1 with the rod 35 being constantly urged in a raised position by means of a spring 36. The upper end 37 of the rod 35 is reduced in diameter so that when the rod is in lowered position there will be an air flow space between the end 37 and the valve opening 31. This permits the interior of the supply conduit 22 to be opened to the atmosphere. The bottom of this end 37 of the rod is joined to the remainder of the rod by a section 38 that is shaped like the surface of a cone. This section 38 operates as a valve to seat on the valve seat 32 when the rod 35 is in elevated position to close the valve opening 31. When the rod 35 is in this raised valve closing position the lower tapered end 39 of the rod 35 is withdrawn from within the orifice 34 as shown in FIGURE 3. However, when the rod is in the position shown in FIGURE 2, for example, this end 39 is within the orifice 34 in order to restrict liquid flow therethrough.

The exit conduit 33 from each receptacle 26 is of generally conical shape and has a collar 40 threaded thereto. This collar 40 supports the removable flow orifice member 34, as shown in FIGURE 3 for example, and in addition supports an annular metal washer 41. This washer 41 is also movably sealed to an exit conduit 43 by means of a pair of rubber O-rings 44. The exit conduit 43 is suspended from the washer 41 by means of an outwardly extending annular flange 45 on the conduit 43 beneath which are located the pair of O-rings 44. As can be seen from FIGURE 3, the top of the exit conduit 43 is spaced from both the washer 41 and the orifice member 34 so that the conduit 43 is relatively free to swing and thus to adjust its position relative to the receptacle 26.

The collar 40 also supports outwardly of the top of the exit conduit 43 and substantially concentric therewith an enclosing member 46. The top of this enclosing member is also provided with an outwardly extending annular flange 47 which is supported on the bottom of an inwardly extending annular flange 48 on the threaded collar 40.

Slidable on the exit conduit or pipe 43 at an intermediate point beneath its ends and a short distance beneath the outwardly flared lower end 49 of the enclosing member 46 is an annular outwardly extending collar 50. Resting on this collar is a helical spring 51 which surrounds the pipe 43.

The upper end of the spring 51 bears against the bottom of a removable cap 52 of annular shape surrounding the pipe 43. Removably attached to this cap 52 as by a bayonet connection 53 (FIGURE 2) is a downwardly extending tubular protective member 54. The weight of this member 54 and cap 52 is sufficient to maintain the spring 51 compressed on the collar 50 as shown in FIGURE 3.

Slidable on the lower end of the pipe 43 is a sleeve 55 also of tubular shape. The bottom of this sleeve 55 rests on a rubber O-ring 56 which is only a short distance above the extreme bottom end 57 of the exit conduit pipe 43. The upper end of the sleeve 55 is provided with an outwardly extending annular flange 58 that is below the collar 50 and that is separated therefrom by means of another rubber O-ring 59 between the collar 50 and the flange 58. As can be seen from this description the spring 51, the collar 50, the O-ring 59 and the sleeve 55 and its top flange 58 are all between the exit pipe 43 and the surrounding protective member 54.

The bottom of the protective member 54 bears directly against the outer surface of the exit pipe 43. However, the top of this member is cut away on its inner surface to provide a chamber 60 between the protective member and the sleeve 55 in which the collar 50, the spring 51 and flange 58 are relatively movable. The bottom of this chamber 60 is defined by an inwardly extending annular ledge 61.

The bottom of the exit conduit or pipe 43 is provided with a laterally facing discharge opening 62 that is normally closed by the bottom end of the slidable sleeve 55 when the sleeve is in its lowermost position bearing against the O-ring 56 which is attached to the bottom end 57 of the exit pipe 43.

The bottom of the protective member 54 is provided with an outwardly and downwardly flaring engaging member 63 for engaging the upwardly extending spout 64 on the container 12 that is adapted to receive the liquid. This spout engaging member 63 is provided with a generally conical inner surface 66 so that engagement of this surface with the top of the spout 64 will align the exit or dispensing pipe 43 with the spout 64.

The bottom end of the protective member 54 above the spout engaging member 63 is provided with a liquid drip intercepting means 67 in the form of an annular plate with an upstanding rim 68.

As can be seen therefore, the exit conduit 43 is free to swing about the bottom of the measuring receptacle 26 so that the device is self-aligning with respect to the successive container spouts 64. In addition, the device is easily disassembled for cleaning which, of course, is required where the liquid being dispensed is intended for human consumption. With this device it sometimes occurs that the top of the exit pipe 43 has liquid thereon carried by the movement of the parts. However, this liquid covered portion is completely protected by the enclosing member 46.

The operation of the device is as follows: The first portion of the operation is the filling of the measuring receptacle 26 which in the illustrated embodiment holds one gallon up to the overflow edge 27 and the liquid that is being measured and dispensed is milk which of course is a readily foamable liquid. In this specific embodiment the containers 12 are made of polypropylene plastic and are adapted to be stored lying on their sides. This is the position of the contained 12 in FIGURES 2, 8 and 9. In order that the containers may be stored one on top of the other without interference by the spouts 64, each container has its bottom raised at one corner as indicated at 69 in FIGURE 4.

FIGURES 5, 6 and 7 illustrate the steps of pre-measuring the gallon amount by means of the measuring receptacle 26. As is shown in FIGURE 5 the level 70 of milk in each of the ten supply conduits 22 is substantially even with the bottom of the horizontal portion 71 of this conduit. Then the valve means 23 is opened which immediately flows milk from the manifold pipe 21 through all ten supply conduits 22 simultaneously. In the following description of the rest of the operation reference will be made to only one dispensing device 11 and its component parts, although it should be noted that actually all dispensing devices are operating simultaneously so as to fill ten one-gallon containers simultaneously.

When the valve 23 is opened the milk 72 flows through the supply conduit 22 including the vertical pipe portion 25 for a predetermined time by a time control mechanism (not shown). At the end of this time the supply conduit 22 is full of milk and the measuring receptacle 26 is full of milk except for a very small volume just beneath the overflow edge portion 27. During this filling the movable rod 35 is in its raised position, as shown in FIGURES 5 and 6, so that the conical section 38 thereon closes the vacuum breaker valve and the tapered lower end 39 of the rod is out of the flow orifice 34. Then in the next step, as illustrated in FIGURE 7, the rod 35 is depressed against its spring 36 which immediately opens the vacuum breaker valve 30 by withdrawing the conical rod section 38 from the valve seat 32. This permits air to enter through the valve opening 31 so that the milk in the top of the supply conduit 22 falls back to the level 70 and the milk that was in the horizontal portion 71 and vertical portion 25 of the supply conduit 22 flows into the measuring receptacle 26 to fill it to the brim 27 with the excess overflowing as indicated at 73 in FIGURE 7. This overflow portion is returned to the milk source through the pipe fitting 28.

During this operation the ten containers are positioned under the dispensing devices 11 and these ten containers are located on the vertically movable platform 15 as indicated in FIGURE 1 where only three of the ten containers are shown in order to avoid complicating the illustration.

At this time the lowering of the vertically movable rod 35 restricts the flow orifice 34 in the exit conduit member 33. The platform 15 is then raised by means contained within the cabinet 10 so that the spout 64 of the container 12 engages the lower surface of its spout engaging member 63 and this inner surface which is of generally conical shape aligns the spout 64 with the bottom of the exit conduit 43.

Further upward movement of the container 12 by the platform 15 causes the outer protective member 54 to be moved upwardly along the sleeve 55 with the result that the lower end 57 of the exit conduit 43 with the slidable sleeve 55 in fully extended position thereon in order to protect this lower end from contamination is projected through the spout 64 into the container.

This sleeve 55 covered exit conduit 43 continues to be projected through the spout 64 until the ledge 61 on the inner surface of the portective member 54 engages the upper sleeve flange 58 as shown in FIGURE 4. During this movement the protective member 54 is of course being shoved upwardly, as previously described, with the result that the spring 51 is being stretched. Engagement of the ledge 61 with the sleeve flange 58 then slides the sleeve 55 upwardly as shown in FIGURE 4 to expose the bottom discharge opening 62. However, the lower end 57 of the dispensing conduit 43 that contains the opening 62 is not exposed to ambient air, as both this lower end and the enclosing sleeve 55 are by this time well within the container 12.

As soon as the discharge opening 62 has been opened up by the sleeve 55 being moved upwardly along the conduit 43 milk begins to flow by gravity from the measuring receptacle 26, down the exit conduit 43 and out the discharge opening 62 into the milk container. Because the lower end 39 of the vertically movable rod 35 is in the exit orifice 34, as shown in FIGURE 2, the flow rate of the milk into the container is relatively slow. This slow rate of flow serves to inhibit foaming of the milk within the container 12. Foaming is also curtailed by discharging the milk through the opening 62 laterally with relation to the bottom of the container 12.

The operation of the vertically movable rod 35 is so timed that the rod 35 is not moved back upwardly to withdraw the lower end 39 from the orifice 34 until the milk level 74 in the container is sufficient to cover the discharge orifice 62. At this time the timing mechanism (not shown) moves the rod 35 upwardly to again close the vacuum breaker valve 30 in the manner previously described and open the orifice 34 for full flow of milk. Foaming at this time is much less a problem as now the discharge orifice 62 is beneath the level 74 so that the remaining milk flows into the body of milk within the container without entrapping air. In a typical installation the timing device is so arranged that it takes about 20 seconds for the milk to reach the level where it covers the opening 62 and only four seconds to finish filling the container. Thus the entire gallon of milk is transferred from the measuring receptacle 26 to the container 12 in 24 seconds. As ten containers are being filled simultaneously that means that ten gallons of milk are transferred to ten containers in 24 seconds.

The spring 51 is compressed between the cap 52 and the movable collar 50 by the weight of the suspended protective member 54. Then, as the protective member 54 is moved upwardly with respect to the exit conduit 43 by reason of the container 12 being raised upwardly against the bottom of the protective member 54, as previously described, the spring expands to follow the upward movement of the cap 52. The spring 51 therefore provides a continuous downward pressure on the sleeve 55 by operating through the collar 50 and rubber ring 59 to urge continuously the sleeve downwardly. This action is provided in order to prevent accidental upward displacement of the sleeve 55 which would prematurely expose the lower end of the conduit 43 including the opening 62. With this arrangement, the sleeve is never accidentally moved upwardly by movement of the other parts of the apparatus and is not moved until the precise time when the ledge 61 engages the sleeve flange 58 in the manner described earlier.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. A liquid dispensing device, comprising: a measuring receptacle for said liquid; means forming an overflow portion on said receptacle to limit the liquid contained therein to a predetermined maximum level; an exit conduit from said receptacle having a flow orifice therein; a supply conduit to said receptacle having a discharge end within said receptacle and an elevated portion above the receptacle; a vacuum breaker means in said supply conduit communicating with the atmosphere; means for flowing liquid through said supply conduit into said receptacle, the liquid level in said receptacle being beneath said overflow portion; and a member movable between two positions, in one position to restrict flow through said orifice and simultaneously open said vacuum breaker means to cause a further liquid portion to flow from said conduit into said receptacle, and in another position to permit free flow through said orifice, said further liquid portion serving to fill said receptacle substantially to said overflow portion.

2. The device of claim 1 wherein said vacuum breaker means and said orifice are linearly aligned along a line passing through said receptacle end, and said movable member extends through said end.

3. A liquid dispensing device, comprising: a measuring receptacle for said liquid; an exit conduit from said receptacle having a discharge opening adjacent its outer end adapted to discharge liquid therethrough into a container having spout means; a sleeve slidable on said conduit outer end normally covering and closing said opening; a tubular protective member normally in position surrounding said sleeve and said outer end and longitudinally movable relative to both said sleeve and said outer end; a spout means engaging member on said protective member; means for causing relative movement between said conduit and said container with said engaging member engaging said spout means, said protective member being thereby moved toward said measuring receptacle with said sleeve covered outer end of said conduit projecting through said spout means into the container; interengaging means on said protective member and sleeve for moving said sleeve from said conduit opening on further relative movement between said container and conduit for flow of liquid from said measuring receptacle, through said conduit discharge opening into said container; and liquid drip intercepting means on said protective member between said receptacle and said spout means engaging member.

4. A liquid dispensing device, comprising: a measuring receptacle for said liquid; an exit conduit from said receptacle having a discharge opening adjacent its outer end adapted to discharge liquid therethrough into a container having spout means; a sleeve slidable on said conduit outer end normally covering and closing said opening; a tubular protective member normally in position surrounding said sleeve and said outer end and longitudinally movable relative to both said sleeve and said outer end; spring means urging said sleeve toward its said normal position where it closes said opening; means sealingly connecting said exit conduit to said receptacle for angular movement relative thereto; a spout means engaging member on said protective member substantially covering said spout means when in engagement therewith; means on said spout means engaging member for aligning said spout means with said exit conduit; liquid drip intercepting means on said protective member between said receptacle and said spout means engaging member; means for causing relative movement between said conduit and said container with said engaging member engaging said spout means, said protective member being thereby moved toward said measuring receptacle with said sleeve covered outer end of said conduit projecting through said spout means into the container; interengaging means on said protective member and sleeve for moving said sleeve from said conduit opening on further relative movement between said container and conduit for flow of liquid from said measuring receptacle, through said conduit into said container, said sleeve movement being against the urging of said spring means; and an enclosing member extending from said receptacle and surrounding the portion of said exit conduit between said receptacle and said protective member.

5. The device of claim 4 wherein said conduit has an outer end and said exit opening is located adjacent said outer end and discharges laterally of said conduit.

6. A liquid dispensing device, comprising: a measuring receptacle for said liquid; means for flowing liquid from said receptacle through an exit conduit from said receptacle; a supply conduit for supplying liquid to said receptacle; means for flowing liquid through said supply conduit into said receptacle; movable means for causing a further liquid portion to flow from said conduit into said receptacle and simultaneously for restricting said exit conduit for retarding flow of liquid through said exit conduit, said exit conduit having a discharge opening adjacent its outer end and adapted to discharge liquid therethrough into a container; a movable closure means on said conduit normally closing said opening; means for causing relative movement between said conduit and said container in a first path portion to project said outer end into said container and then in a second path portion to remove the outer end from the container; and moving means for moving said closure means to open said discharge opening at a predetermined point in said first path portion, said moving means including a protective member normally surrounding said exit conduit adjacent said outer end during said movement in said first path portion.

7. A liquid dispensing device, comprising: a measuring receptacle for said liquid; an exit conduit from said receptacle having a discharge opening adjacent its outer end adapted to discharge liquid therethrough into a container having spout means, said exit conduit having a liquid flow orifice; a supply conduit for liquid having a discharge end within said receptacle and an elevated portion above the receptacle; means for flowing liquid through said supply conduit into said receptacle; a vacuum breaker means in said supply conduit communicating with the atmosphere; a member movable between two positions, in one position to restrict flow through said orifice and simultaneously open said vacuum breaker means to cause a further liquid portion to flow from said conduit into said receptacle, and in another position to permit free flow through said orifice; a sleeve slidable on said conduit outer end normally covering and closing said opening; a tubular protective member normally in position surrounding said sleeve and said outer end and longitudinally movable relative to both said sleeve and said outer end; a spout means engaging member on said protective member; means for causing relative movement between said conduit and said container with said engaging member engaging said spout means, said protective member being thereby moved toward said measuring receptacle with said sleeve covered outer end of said conduit projecting through said spout means into the container; and interengaging means on said protective member and sleeve for moving said sleeve from said conduit opening on further relative movement between said container and conduit for flow of liquid from said measuring receptacle, through said conduit into said container.

8. A liquid dispensing device, comprising: a measuring receptacle for said liquid; means for forming an overflow portion on said receptacle to limit the liquid contained therein to a predetermined maximum level; a supply conduit for liquid having a discharge end within said receptacle and an elevated portion above the receptacle; a vacuum breaker means in said supply conduit communicating with the atmosphere; means for flowing liquid through said supply conduit into said receptacle, the liquid level in said receptacle being beneath said overflow portion; an exit conduit from said receptacle having a discharge opening adjacent its outer end adapted to discharge liquid therethrough into a container having spout means, said exit conduit having a liquid flow orifice; a member movable between two positions, in one position to restrict flow through said orifice and simultaneously open said vacuum breaker means to cause a further liquid portion to flow from said conduit into said receptacle, and in another position to permit free flow through said orifice, said further liquid portion serving to fill said receptacle substantially to said overflow portion; a sleeve slidable on said conduit outer end normally covering and closing said opening; a tubular protective member normally in position surrounding said sleeve and said outer end and longitudinally movable relative to both said sleeve and said outer end; spring means urging said sleeve toward its said normal position where it closes said opening; means sealingly connecting said exit conduit to said receptacle for angular movement relative thereto; a spout means engaging member on said protective member substantially covering said spout means when in engagement therewith; means on said spout means engaging member for aligning said spout means with said exit conduit; liquid drip intercepting means on said protective member between said receptacle and said spout means engaging member; means for causing relative movement between said conduit and said container with said engaging member engaging said spout means, said protective member being thereby moved toward said measuring receptacle with said sleeve covered outer end of said conduit projecting through said spout means into the container; interengaging means on said protective member and sleeve for moving said sleeve from said conduit opening on further relative movement between said container and conduit for flow of liquid from said measuring receptacle, through said conduit into said container; and an enclosing member extending from said receptacle and surrounding the portion of said exit conduit between said receptacle and said protective member.

9. The method of discharging a foamable liquid stream into a container having a bottom, comprising: directing said stream in a first portion toward said bottom and then in a second portion laterally along said bottom, and enclosing said stream at said first portion and at the junction of said first and second portions, said directing being at one speed until liquid in said container substantially covers said junction and then said directing being at a speed greater than said one speed.

References Cited by the Examiner

UNITED STATES PATENTS

| 904,092 | 11/1908 | Schneider | 141—356 X |
|---|---|---|---|
| 956,876 | 5/1910 | Bastian | 141—294 |
| 966,270 | 8/1910 | Van Leir | 141—354 |
| 1,216,574 | 1/1917 | Kiefer | 141—288 X |
| 1,673,446 | 6/1928 | Eveleth | 222—108 |
| 1,779,739 | 10/1930 | Kantor et al. | 141—286 X |
| 2,901,009 | 8/1959 | Potter | 141—286 |
| 3,005,473 | 10/1961 | Ring | 141—264 X |
| 3,100,507 | 8/1963 | Price | 137—588 |

LAVERNE D. GEIGER, *Primary Examiner.*

SAMUEL ROTHBERG, E. EARLS, *Examiners.*